United States Patent
Schwartz

(10) Patent No.: US 8,359,031 B2
(45) Date of Patent: Jan. 22, 2013

(54) COMPUTER BASED METHOD AND SYSTEM FOR LOGGING IN A USER MOBILE DEVICE AT A SERVER COMPUTER SYSTEM

(75) Inventor: Evan Schwartz, Brooklyn, NY (US)

(73) Assignee: Clear Channel Management Services, Inc., San Antonio, TX (US)

(*) Notice: Subject to any disclaimer, the term of this patent is extended or adjusted under 35 U.S.C. 154(b) by 552 days.

(21) Appl. No.: 12/234,488

(22) Filed: Sep. 19, 2008

(65) Prior Publication Data

US 2010/0075641 A1     Mar. 25, 2010

(51) Int. Cl.
*H04W 4/00* (2009.01)

(52) U.S. Cl. .......... 455/435.1; 455/411; 455/414.1; 455/466; 709/203; 709/206

(58) Field of Classification Search ............. 455/435.1
See application file for complete search history.

(56) References Cited

U.S. PATENT DOCUMENTS

| | | | |
|---|---|---|---|
| 2001/0028636 A1* | 10/2001 | Skog et al. | 370/328 |
| 2002/0015403 A1* | 2/2002 | McConnell et al. | 370/352 |
| 2003/0035409 A1* | 2/2003 | Wang et al. | 370/349 |
| 2003/0050918 A1* | 3/2003 | Pilkington et al. | 707/1 |
| 2003/0186682 A1* | 10/2003 | Aschir | 455/411 |
| 2005/0144251 A1* | 6/2005 | Slate | 709/215 |
| 2007/0140470 A1* | 6/2007 | Malik | 379/374.01 |
| 2010/0042688 A1* | 2/2010 | Maghraby | 709/206 |
| 2011/0035434 A1* | 2/2011 | Lockwood | 709/203 |

* cited by examiner

*Primary Examiner* — Charles Appiah
*Assistant Examiner* — Mazda Sabouri
(74) *Attorney, Agent, or Firm* — Garlick & Markison; Edward J. Marshall

(57) ABSTRACT

The invention provides a computer-based method for logging a user mobile device onto a server computer system including registering a unique identifier of a user mobile device, receiving a first message from the user mobile device, detecting an Internet Protocol address associated with the user mobile device, receiving the unique identifier corresponding to the Internet Protocol address; and transmitting to the user mobile device a second message.

8 Claims, 17 Drawing Sheets

COMPUTER BASED METHOD AND SYSTEM FOR LOGGING IN A USER MOBILE DEVICE AT A SERVER COMPUTER SYSTEM

BACKGROUND OF THE INVENTION

1). Field of the Invention

This invention relates to a computer-based method and system for manipulating electronic media such as ringtones and videos.

2). Discussion of Related Art

Mobile phones usually have a number of ringtones that are installed by a manufacturer. A user can select a ringtone from a drop-down list, and it is also sometimes possible to associate different ringtones with different incoming phone numbers.

A user may wish to download a ringtone from a remote server and store the ringtone in memory of the mobile phone. However, a mobile phone and the network that it is connected to are usually too slow and the viewing capabilities on the mobile phone are too limited for finding media on a remote server. A company that provides mobile media content for use on mobile phones will usually also have a website that is accessible from a user computer system over the Internet. The user of the mobile phone may make use of the user computer system to find listings of mobile content on the website through browsing or searching functionality built into the website, and then instruct the website to facilitate downloading of the media content to the mobile phone. A message may, for example, be sent to the mobile phone, and the message can include a link to the media content on the server.

SUMMARY OF THE INVENTION

The invention provides a computer-based method for logging a user mobile device onto a server computer system including registering a unique identifier of a user mobile device, receiving a first message from the user mobile device, detecting an Internet Protocol address associated with the user mobile device, receiving the unique identifier corresponding to the Internet Protocol address; and transmitting to the user mobile device a second message.

The unique identifier is a phone number. The Internet Protocol address is dynamically updated.

The first message is a request for a file. The first message is an SMS message. The second message is an SMS message. The second message has a link to a user-specific homepage.

The method registers the unique identifier of a user mobile device by providing an interface with a field for entering registration information. Entering registration information includes entering a phone number.

The invention also provides a computer-readable storage medium having stored thereon a set of instructions which, when executed by a processor of a computer carries out a method including, registering a unique identifier of a user mobile device, receiving a message from the user mobile device, detecting an Internet Protocol address associated with the user mobile device, receiving the unique identifier corresponding to the Internet Protocol address and transmitting to the user mobile device a file customized for the unique identifier.

The invention further provides a computer system including, a server computer system including a memory and processor connected to the memory, a database stored in the memory, the database including a plurality of registered users, a computer program stored in the memory and executable by the processor, the program including, a first interface that is from the server computer system, the first interface having field for entering registration information, a detecting module for detecting an Internet Protocol address of a user mobile device, a receiving module for receiving a unique identifier of the user mobile device corresponding to the Internet Protocol address, a first matching module for matching the unique identifier with registered user data, and a second interface that is transmitted to a user mobile device, the second interface displaying a user-specific homepage.

BRIEF DESCRIPTION OF THE DRAWINGS

The invention is further described by way of example with reference to the accompanying drawings, wherein.

DETAILED DESCRIPTION OF THE INVENTION

1. Network Overview

Figure 1:
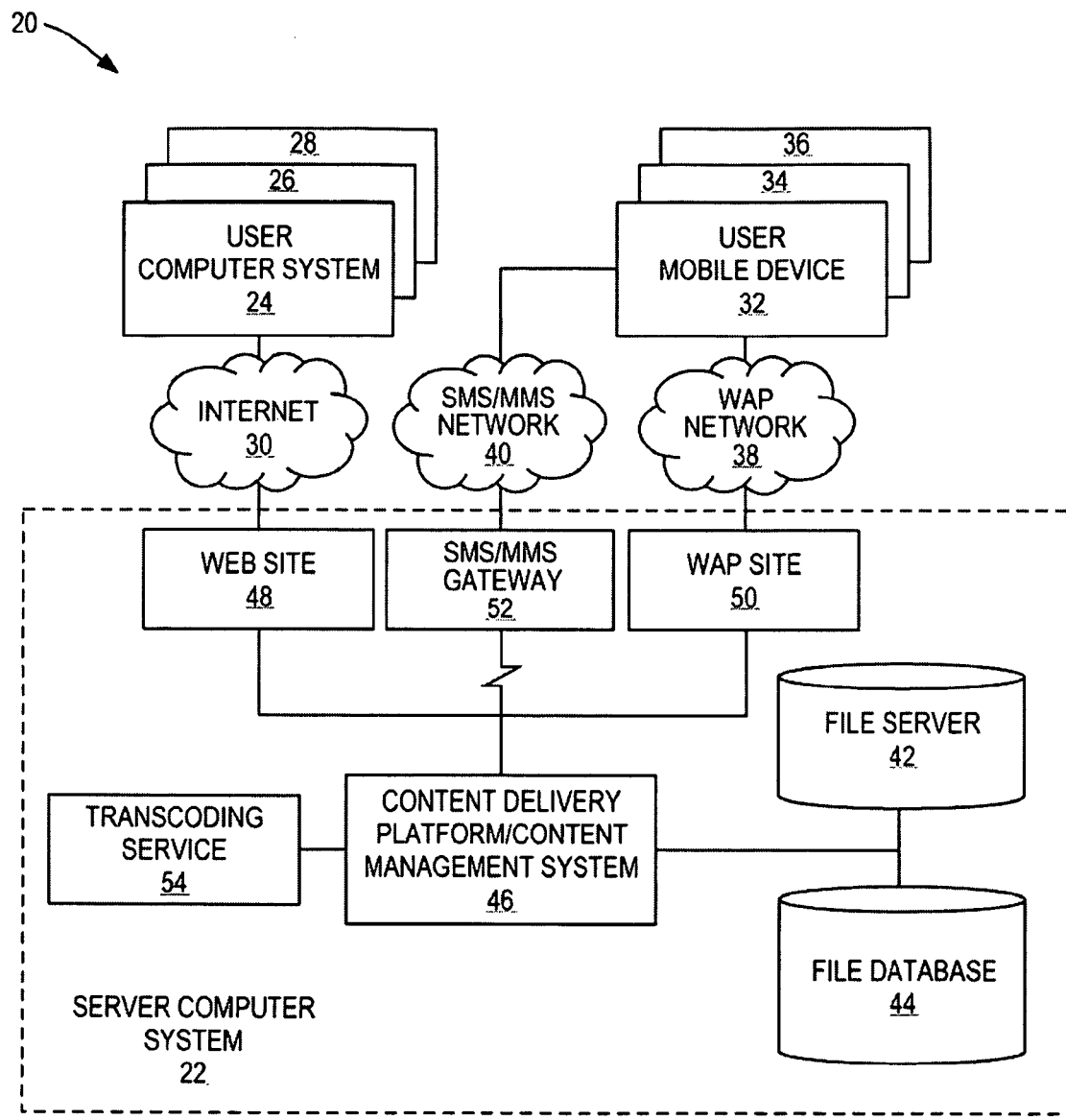
FIG. 1 is a block diagram of a network system in which aspects of the invention are manifested.

FIG. 1 of the accompanying drawings illustrates a network system 20 that embodies features of the invention. The network system 20 includes a server computer system 22, a plurality of user computer systems 24, 26, and 28 that are connected to the server computer system 22 over a network in the form of the Internet 30, and a plurality of user mobile devices 32, 34, and 36 that are connected over a Wireless Application Protocol (WAP) network 38 and over a Short Message Service (SMS) and Multimedia Messaging Service (MMS) network 40 to the server computer system 22.

The server computer system 22 includes a file store in the form of a file server 42, a data store in the form of a file database 44, a content delivery platform and content management system 46, a Web site 48, a WAP site 50, an SMS/MMS gateway 52, and a transcoding service 54. The file database 44 is connected to the file server 42. The content delivery platform and content management system 46 forms the center of the server computer system 22, and all other components including the Web site 48, WAP site 50, SMS/MMS gateway 52, transcoding service 54, file server 42, and file database 44 are directly connected to the content delivery platform and content management system 46. The content delivery platform and content management system 46 indexes files such as ringtones (reduced media content), full-track content, games, wallpaper, and graphics from the file server 42 into the file database 44 and in a structured manner, as will be required for downloading and for the Web site 48, WAP 50, SMS/MMS gateway 52, and transcoding service 54. The transcoding service 54 prepares communications suitable for transmission over the Internet 30, WAP network 38, and SMS/MMS network 40.

2. Web Site

Figure 2:
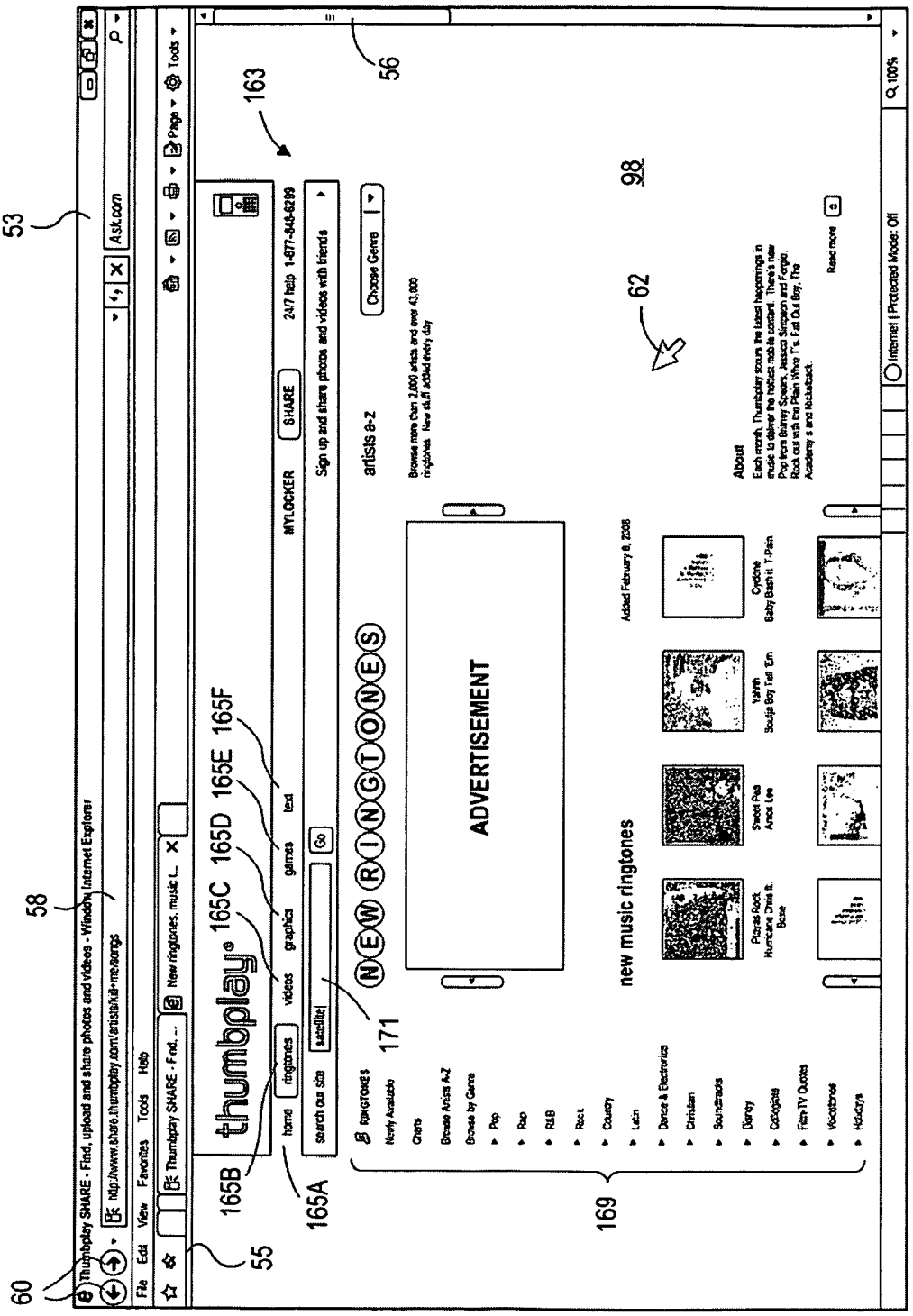
FIG. 2 is a screenshot of a browser view that displays a view of a website.

FIG. 2 illustrates a home page 163 within a browser view 53 at the user computer system 24, 26, or 28 in FIG. 1. The browser view 53 forms part of an Internet browser application such as Internet Explorer®, Netscape®, or Firefox®. The browser view 53 includes a viewing pane 55 within which the home page 163 is displayed. The browser view 53 also includes a vertical scroll bar 56 that can be moved up or down to view portions of the home page 163 if the entire home page 163 does not fit vertically within the viewing pane 55. The browser view 53 also has an address box 58 and back and forward buttons 60. A user can use a mouse to move a cursor 62 into the address box 58, and then depress a button on the mouse to select the address box 58. The user can then utilize a keyboard to enter text such as "http://www.thumbplay.com" in the address box 58, and can then depress an "enter" key on the keyboard to transmit a signal and a request for a page. The text within the address box 58 can also be automatically updated, for example when a user logs into the home page 163. The back and forward buttons 60 can be used to view earlier or subsequent pages.

The home page 163 is in a general area of the Web site 48 in FIG. 1. The home page 163 includes tabs 165A to 165F that provide links to other pages of the general area. In the home page 163, the tab 165B is highlighted, indicating that the home page 163 is in a portion of the general area relating to ringtones.

The home page 163 is typically displayed at one of the user computer systems 24, 26, or 28 in FIG. 1, and provides the user computer systems 24, 26, or 28 access to ringtones through a browse menu 169 or by entering text in a search box 171. Text can, for example, be entered in the search box 171, and an acquiring user can then either select a "go" button 172 or hit "enter" on a keyboard to cause transmission of a signal from the user computer systems 24, 26, or 28 over the internet 30 to the Web site 48 in FIG. 1. The signal includes an address for the Web site 48, a query that is entered in the search box 171, and a return address for the user computer systems 24, 26, or 28. The query is used at the Web site 48 to extract one or more search results. A signal is then transmitted from the Web site 48 over the internet 30 to the user computer systems 24, 26, or 28, the signal including the search result or search results and an address corresponding to the return address received from the user computer 24, 26, or 28.

Not every signal is described in detail herein. One skilled in the art will appreciate that a signal is generated by and transmitted from one computer system and received and processed at another computer system, and will also appreciate what the contents of such a signal will be. One skilled in the art will also appreciate that a computerized step is typically carried out by a respective module of software code stored in memory of a computer. For example, a transmission step is typically carried out by a transmission module, a receiving step is carried out by a receiving module, a password generation step is carried out by a password generation module, etc. These modules are connected to one another so that a step carried out by one module can be followed by a step carried out by another module.

Figure 3:
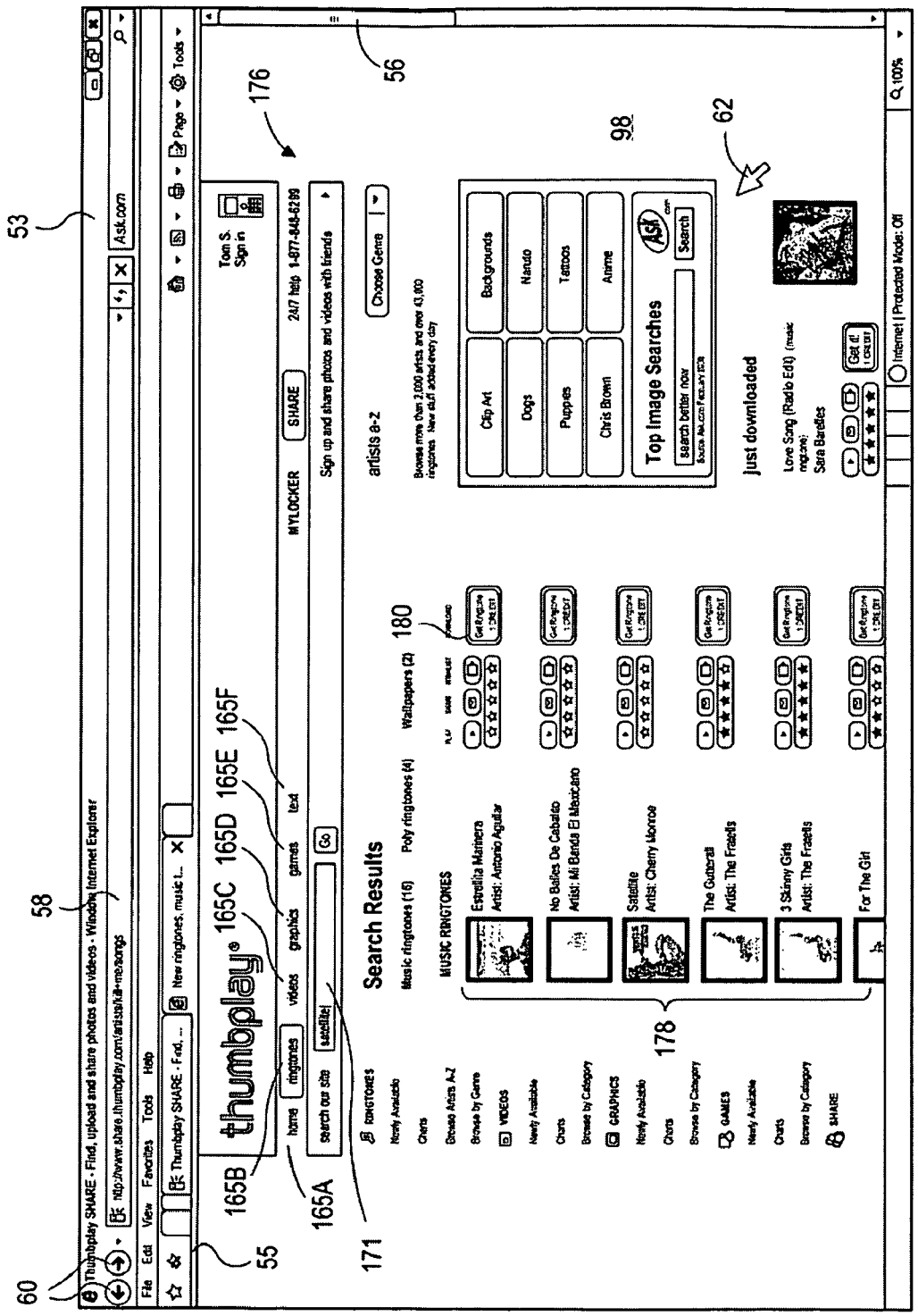
FIG. 3 is a view similar to FIG. 2, after a search has been conducted for media files in a database in FIG. 1.

FIG. 3 shows a view 176 that includes a download page with a plurality of search results 178 that are received at the user computer systems 24, 26, or 28 over the Internet 30 from the Web site 48. Each search result 178 includes a ringtone name, an artist name, and a ringtone download button 180, among other things.

Figure 4:
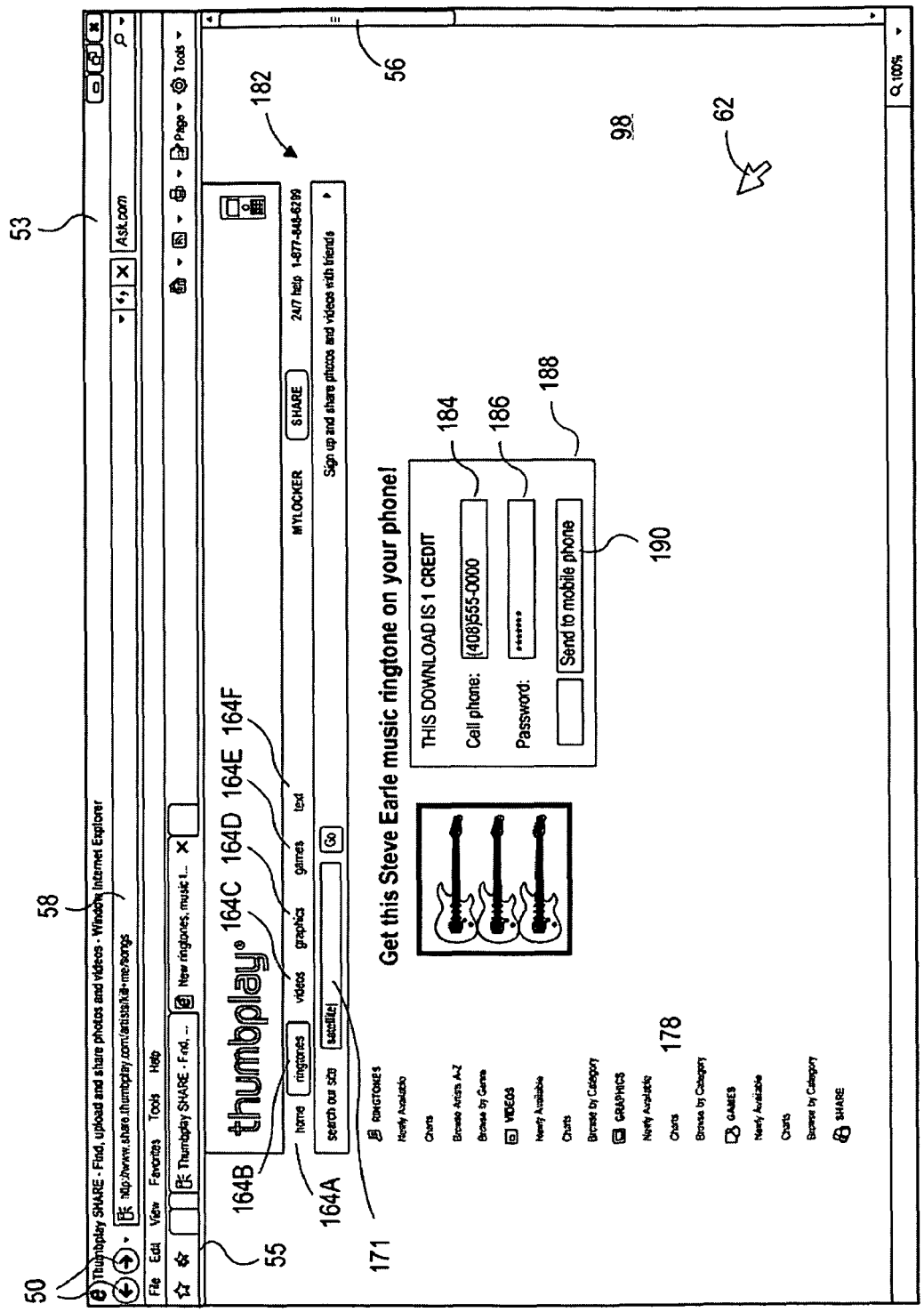
FIG. 4 is a view similar to FIG. 3, wherein registration and login information are completed and an instruction is sent to a server computer system to transmit a media file to a user mobile device.

FIG. 4 shows a view 182 that is displayed upon selection of one of the ringtone download buttons 180 in the view 176 of FIG. 3. A profile of the acquiring user computer system 24 is previously stored on the content delivery platform and content management system 46 of FIG. 1, including a mobile phone number 184 and a password 186. The view 182 includes the mobile phone number 184 and a password text box 188 for entering the password 186. The view 182 also has a "transmission" button 190. Upon selection of the "transmission" button 190, a signal is sent from the user computer system 24 over the Internet 30 to the Web site 48. The Web site 48 communicates with the content delivery platform and content management system 46, which uses the selected search result to access one of the ringtones on the media file server 42. The content delivery platform and content management system 46 then transmits a link corresponding to the accessed ringtone on the media file server 42 over the SMS/MMS network 40 to a user mobile device 32, 34, or 36 having the mobile phone number 184 in the view 182 of FIG. 4.

Figure 5:
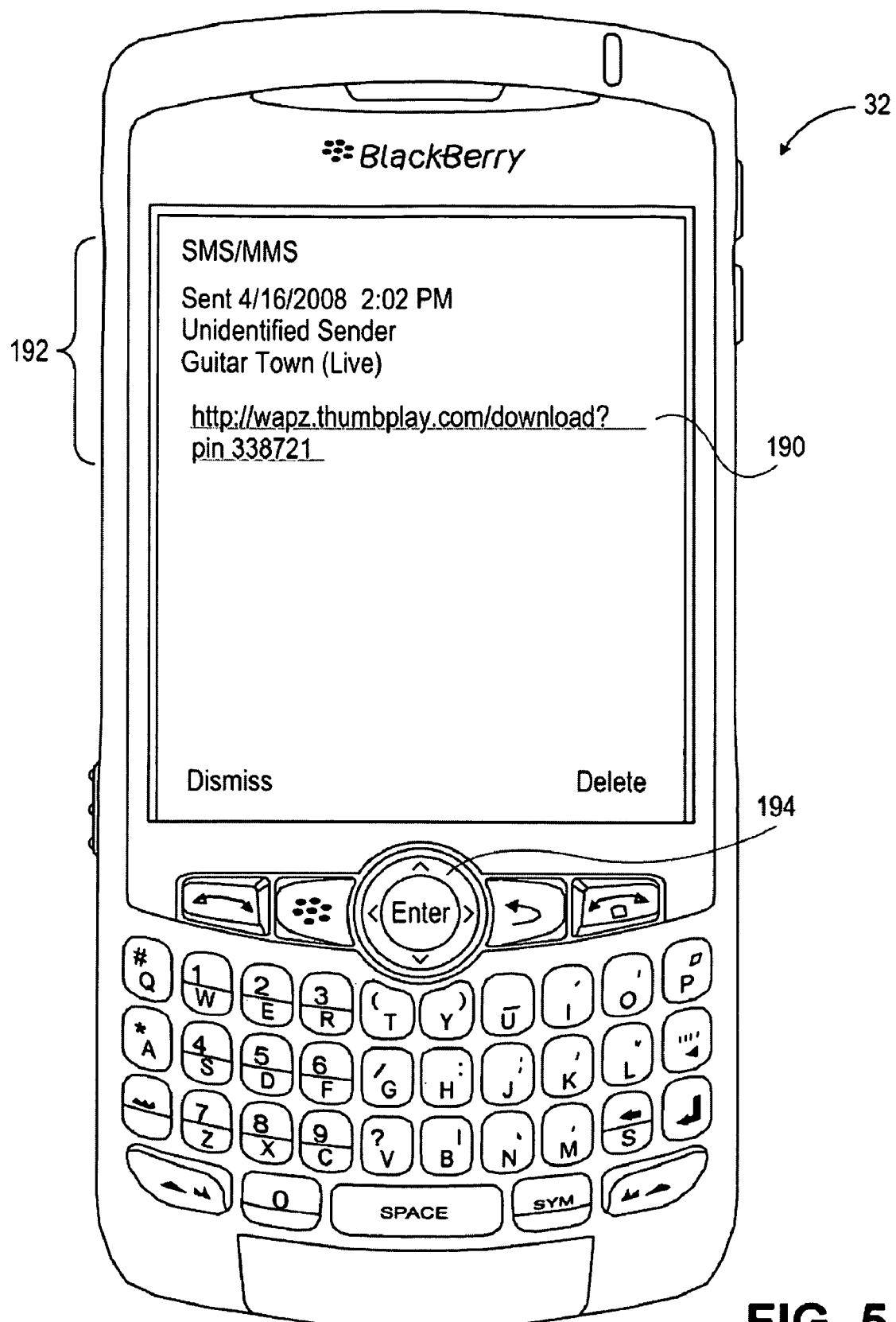
FIG. 5 is a front view of a user mobile device displaying an SMS message that is received by the user mobile device, the message including a link.

As shown in FIG. 5, the link 190 that is received at for example the user mobile device 32 comes in the form of an SMS message 192 that includes the link 190. An acquiring user can utilize "arrow" and "enter" keys 194 of the user mobile device 32 to select the link 190.

Figure 7:
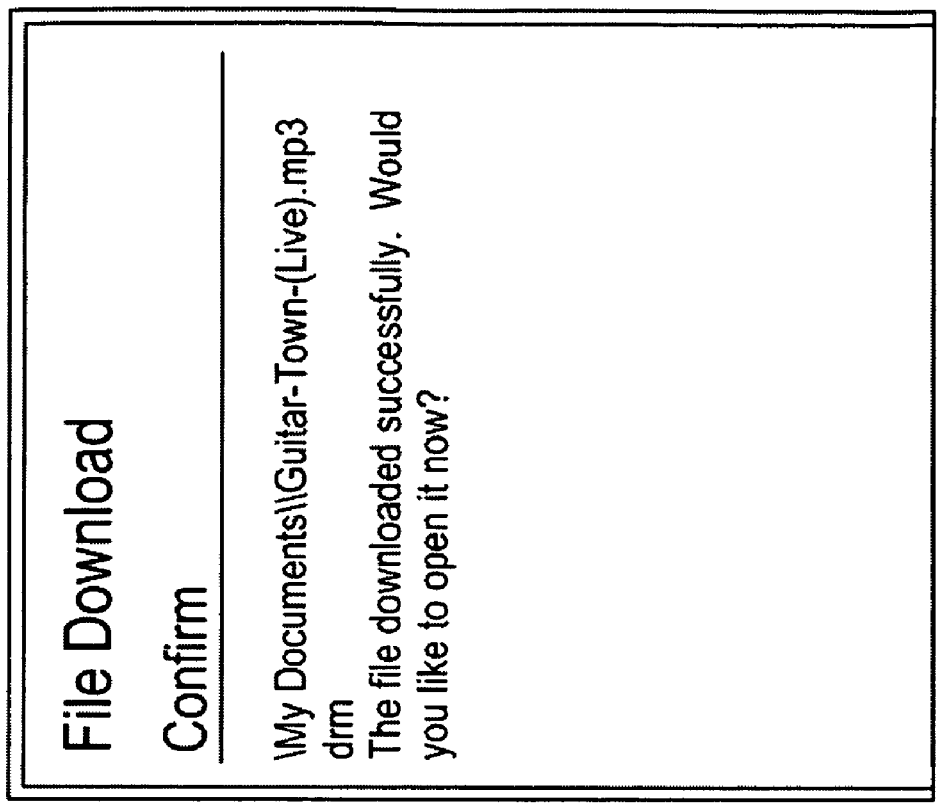
FIG. 7 is a view that is displayed on the user mobile device following successful downloading and saving of the media file.
Figure 6:
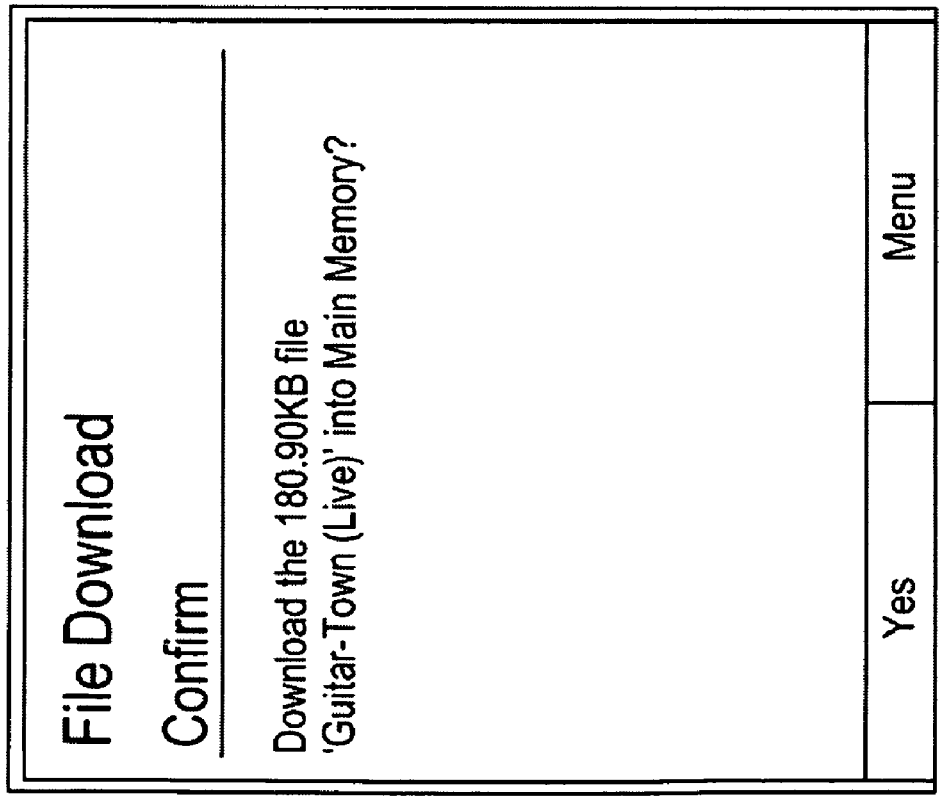
FIG. 6 displays a view on a WAP browser of the user mobile device to confirm downloading of a media file into memory of the user mobile device.

Upon selection of the link 190 and confirmation of the download as shown in FIG. 6, the user mobile device 32 transmits a requesting signal over the WAP network 38 in FIG. 1 to the content delivery platform and content management system 46. The content delivery platform and content management system 46 then automatically transmits a copy of the selected ringtone (or other media file) from the media file server 42 over the WAP network 38 to the respective user mobile device 32. The respective user mobile device 32 then automatically stores the copy of the selected ringtone in memory. As shown in FIG. 7, the user mobile device 32 then displays a message that confirms that the file has been downloaded and stored in memory of the user mobile device 32.

3. SMS with a Search Identifier

Figure 8:
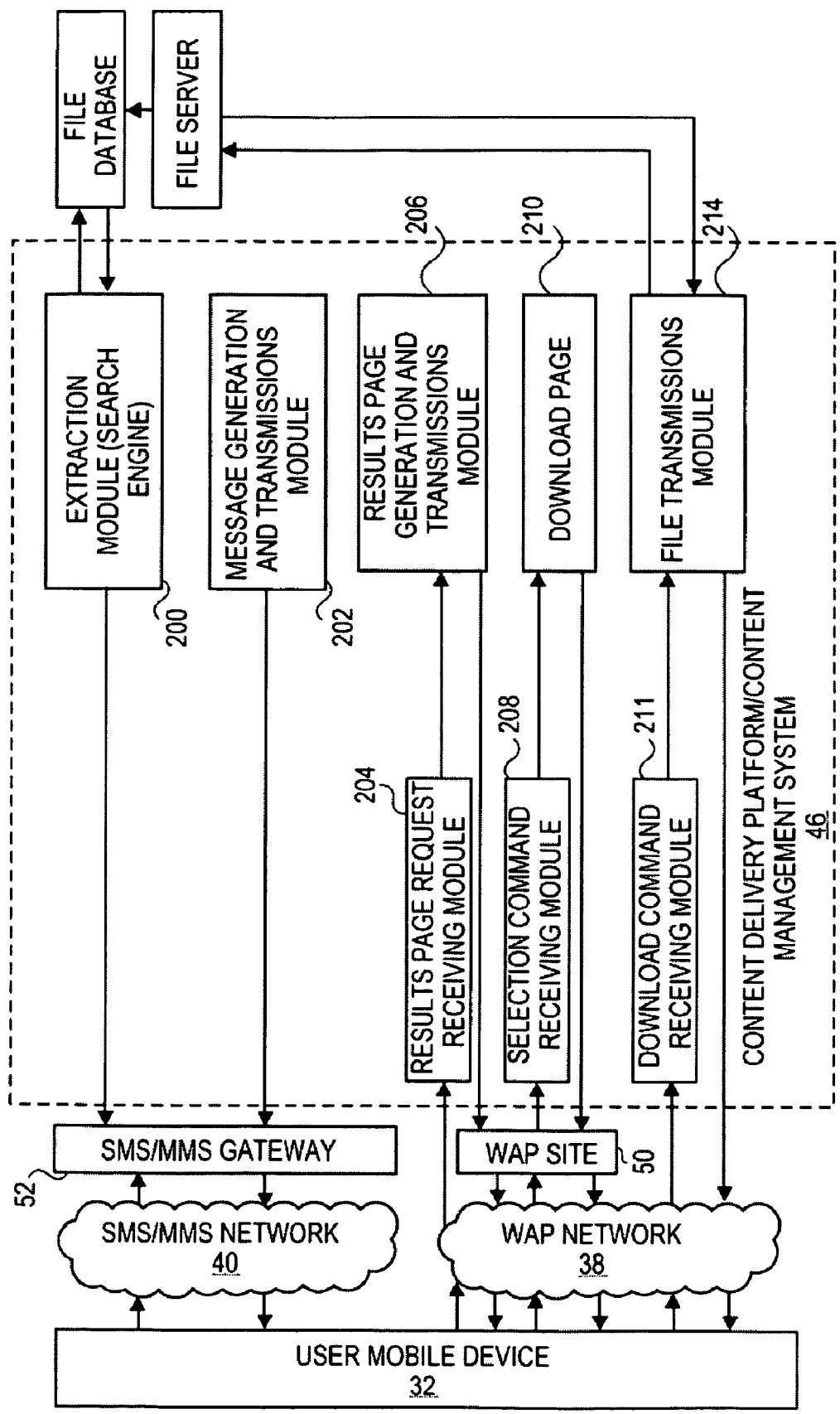
FIG. 8 is a block diagram illustrating components that are used primarily for processing a search request in a message from the user mobile device.

FIG. 8 illustrates components of the content delivery platform and content management system 46 that are used for responding to an SMS message with a search identifier "Get" that is received directly from for example the user mobile device 32 in FIG. 1. The components of the content delivery platform and content management system 46 shown in FIG. 8 provide a system that is different from and in addition to the system as hereinbefore described that utilizes the Website 48 in FIG. 1.

The content delivery platform and content management system 46 further includes a search engine, hereinafter referred to as an "extraction module" 200, a message generation and transmissions module 202, a results page request receiving module 204, a results page generation and transmissions module 206, a selection command receiving module 208, a download page 210, a download command receiving module 211 and a file transmissions module 214. The functioning of the system shown in FIG. 8 will now be described with reference to FIGS. 9 to 14 in conjunction with FIG. 8.

Figure 10:
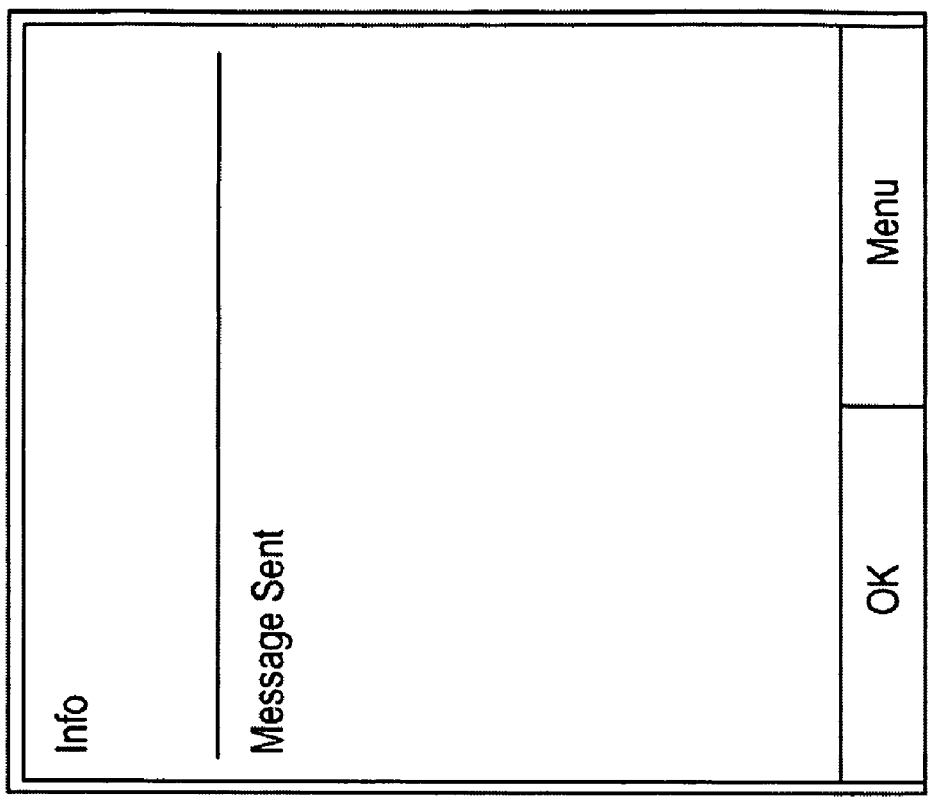
FIGS. 9 to 14 are views that are displayed on the user mobile device to illustrate the functioning of the system of FIG. 8.
Figure 9:
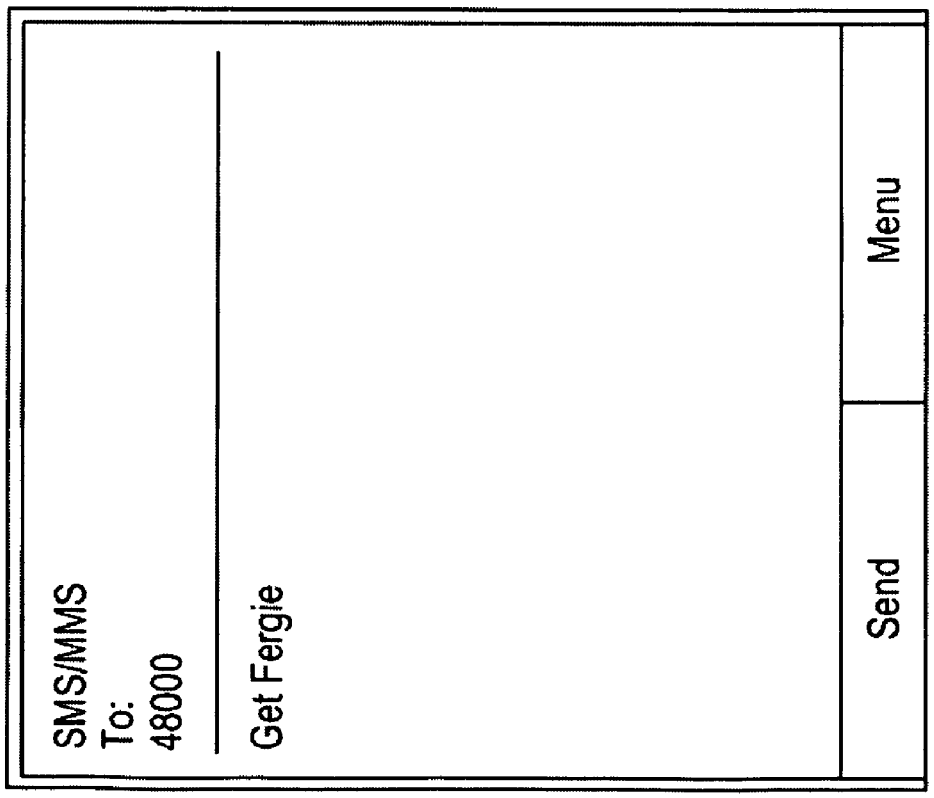

As shown in FIG. 9, the user of the user mobile device 32 prepares a message to an address 48000 with the text "Get Fergie" and then selects a "send" button to transmit the message. The message is transmitted from the user mobile device 32 over the SMS/MMS network 40 and is received by the SMS/MMS gateway 52. FIG. 10 shows a view that is displayed on the user mobile device 32 following transmission of the message.

SMS/MMS gateway 52 is connected to the extraction module 200. The extraction module 200 recognizes the text "Get" and the search query "Fergie" in the SMS message. The text "Get" serves as a search identifier. Upon detection of the search identifier "Get" by the extraction module 200, the extraction module 200 thus determines that the message includes a search identifier and then utilizes the search query "Fergie" to extract a plurality of search results from the file database 44.

Figure 11:
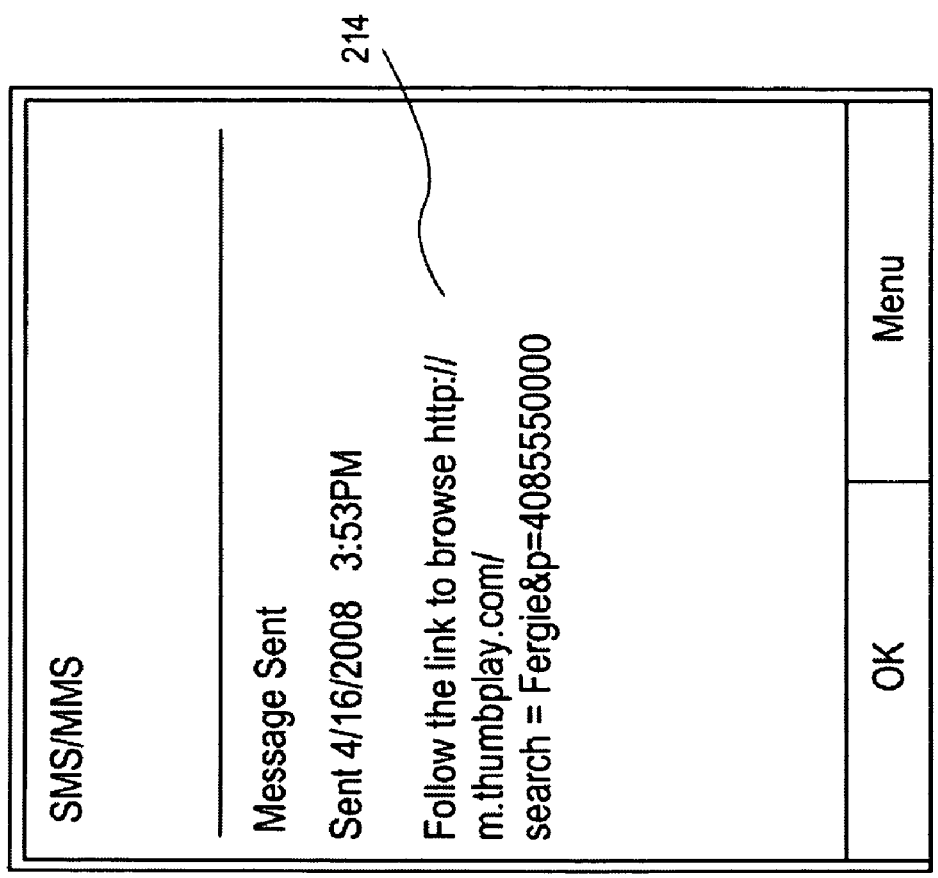

The message generation and transmissions module 202 is connected to the extraction module 200 and transmits a message through the SMS/MMS gateway 52 and the SMS/MMS network 40 to the user mobile device 32. If, as in the present example, the extraction module 200 has detected the search identifier "Get" in the SMS message of FIG. 9, the message that is transmitted by the message generation and transmissions module 202 as received by the user mobile device 32 and is shown in FIG. 11. The message includes a link 214 that can be selected by a user utilizing the "arrow" and "enter" keys 194 of the user mobile device 32 in FIG. 5. The link 214 includes the search request "Fergie" and a return address (the phone number) of the user mobile device 32. If, on the other hand, the search identifier "Get" was not present in the text, a message is sent to the mobile user device 32 with text stating that the message from the user mobile device 32 was in error.

4. WAP Site

Figure 12A:
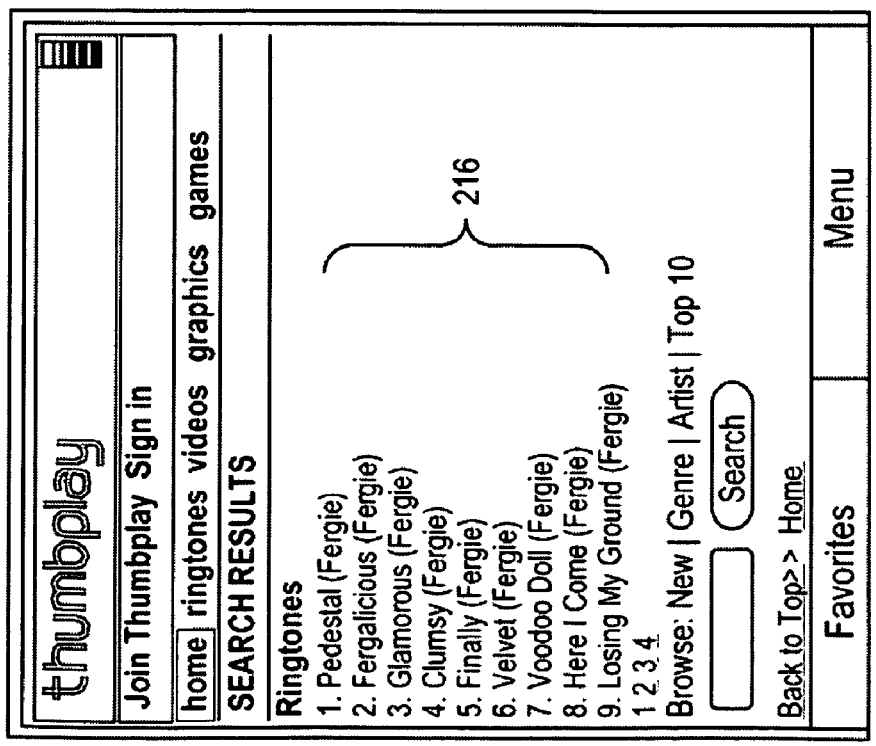

FIG. 12A shows a view of a WAP browser that automatically launches upon selection of the link 214 in FIG. 11. Upon selection of the link 214, a results page request command is transmitted by the user mobile device 32 over the WAP network 38 and is received by the results page request receiving module 204. The command includes the entire link 214. The results page generation and transmissions module 206 is connected to the results page request receiving module 204 and to the extraction module 200. The results page generation and transmissions module 206 generates a results page that includes the search results that are extracted by the extraction module 200 and transmits the results page via the WAP site 50 and the WAP network 38 to the user mobile device 32. FIG. 12A shows the results page and the search results 216 that are displayed by the WAP browser of the user mobile device 32.

Figure 12B:
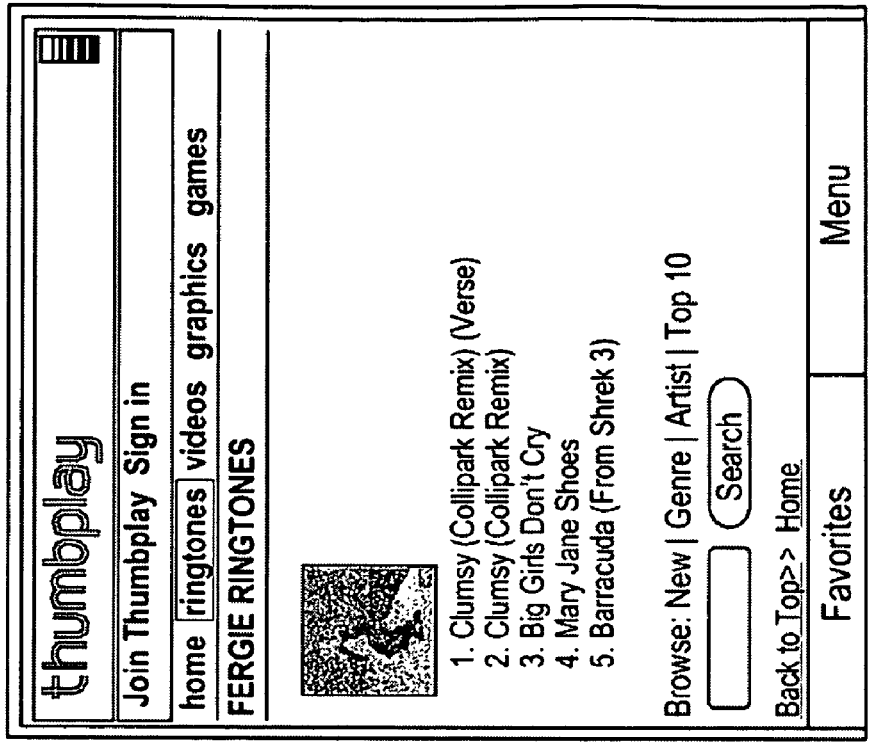

FIG. 12B shows an alternative where a WAP browser is directed to an artist-specific page. An artist-specific page is displayed when a one-to-one match can be made between the search query and the artist-specific page. A track-specific page can be displayed when a one-to-one match can be made between the query and the track. A results page such as in FIG. 12A is displayed when a one-to-one relationship cannot be made between the query and either an artist or a track. The results page thus displays results from more than one artist or track.

Figure 13:
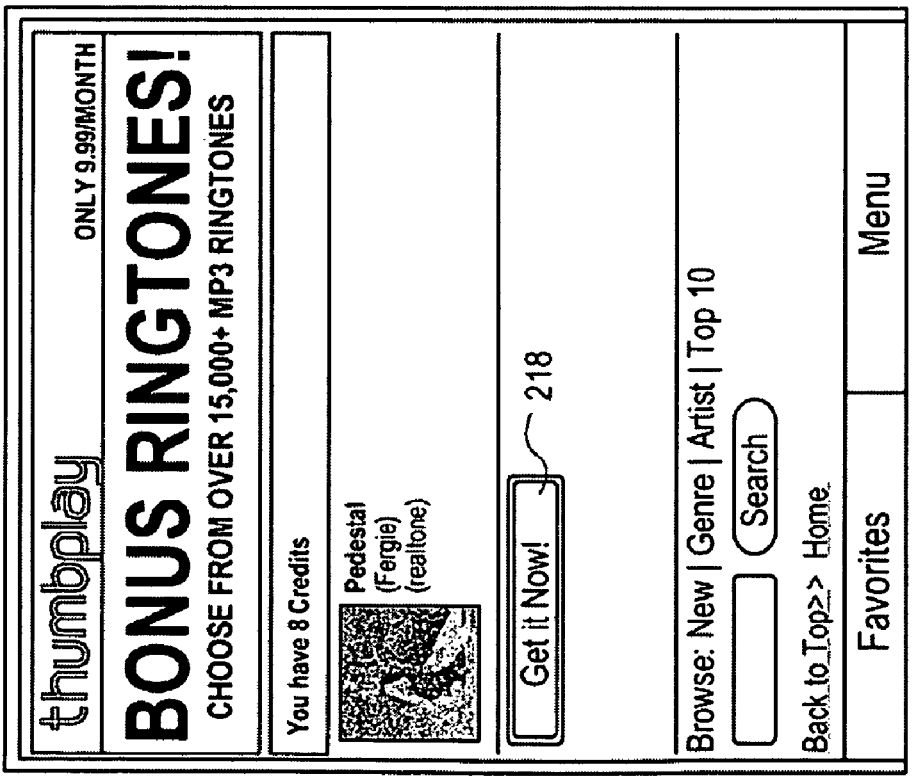

In the present example, the user selects the first search result "pedestal" to cause transmission of a selection command from the user mobile device 32 over the WAP network 38 and the WAP site 50. The selection command receiving module 208 is connected to the WAP site 50 and to the download page 210 so that the download page 210 is transmitted over the WAP site 50 and the WAP network 38 to the user mobile device 32. FIG. 13 shows a view of the download page 210 on the user mobile device 32. The download page 210 includes a "download" button 218. The buttons of the user mobile device 32 can be used to select the download button 218, which causes transmission of a download command from the user mobile device 32 over the WAP network 38.

Figure 14:
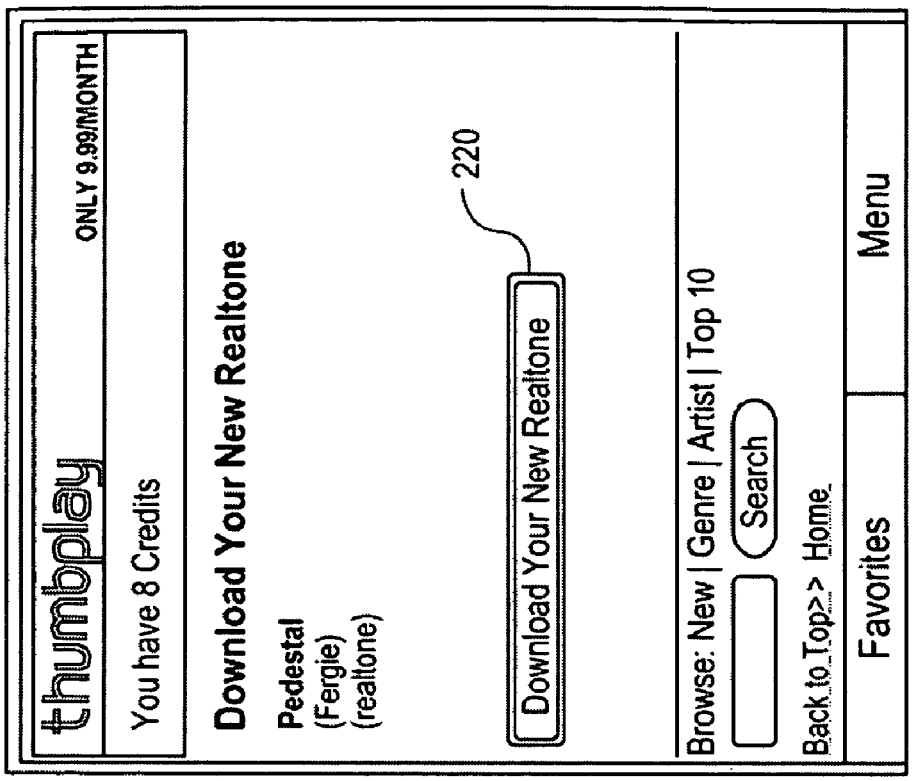

The download command receiving module 211 is connected to the WAP network 38 so as to receive the download command. The file transmissions module 212 is connected to the file server 42 and to the download command receiving module 211. The download command includes the name of the particular file in the file server 42, i.e., the file corresponding to the entry "pedestal" in the file database 44. The file transmissions module 214 utilizes the name of the entry in the download command to extract the corresponding file from the file server 42, and then transmits the file over the WAP network 38 to the user mobile device 32. FIG. 14 shows a view that is displayed on the user mobile device 32 to confirm downloading of the respective file. Upon selection of a confirmation button 220, the file is downloaded and saved in memory of the user mobile device 32 as hereinbefore described with reference to FIGS. 6 and 7.

It can also been seen that the SMS messaging capabilities of the user mobile device 32 can be used to transmit a request for a media file. There is thus no need to utilize the WAP browser on the user mobile device 32 to search for and request a media file or to use a Web browser on a personal computer to search for and request a media file.

5. Registration and Login of User Computer

Figure 15:
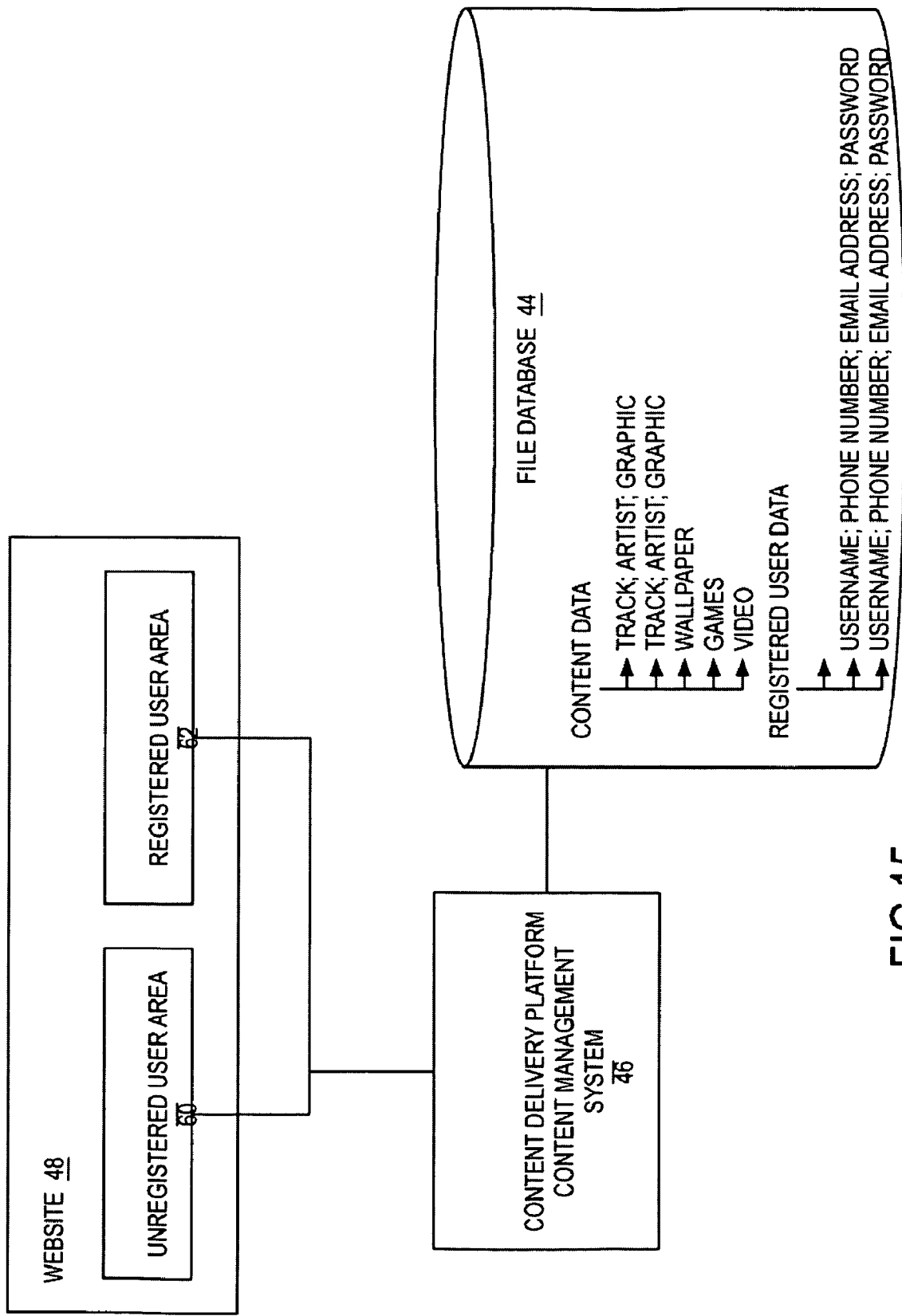
FIG. 15 is a block diagram of components of a server computer system in FIG. 1.

As shown in FIG. 15 the file database 44 includes content data and registered user data. The content data includes a plurality of tracks, each track having an associated artist and an associated graphic. Each track corresponds to a respective media file in the file database 44. The registered user data includes a plurality of user names, each with an associated phone number, email address and password.

The Web site 48 includes an unregistered user area 260 and a registered user area 262. A user at one of the user computer systems 24, 26 or 28 in FIG. 1 can log onto the Web site 48 by entering login information or by automatically transmitting a cookie to the server computer system 22. The server computer system 22 compares the login information or the cookie with registered user data in the file database 44 and, upon a favorable comparison, provides the user computer system 24, 26 or 28 access to the registered user area 262. In the event of an unfavorable comparison or if login information or a cookie is not received at the server computer system 22, the respective user computer system 24, 26 or 28 is only provided access to the unregistered area 260. A user computer system 24, 26 or 28 that is provided only access to the unregistered user area 260 can still obtain access to the registered user area 262 following completion of a registration process.

Figure 16:
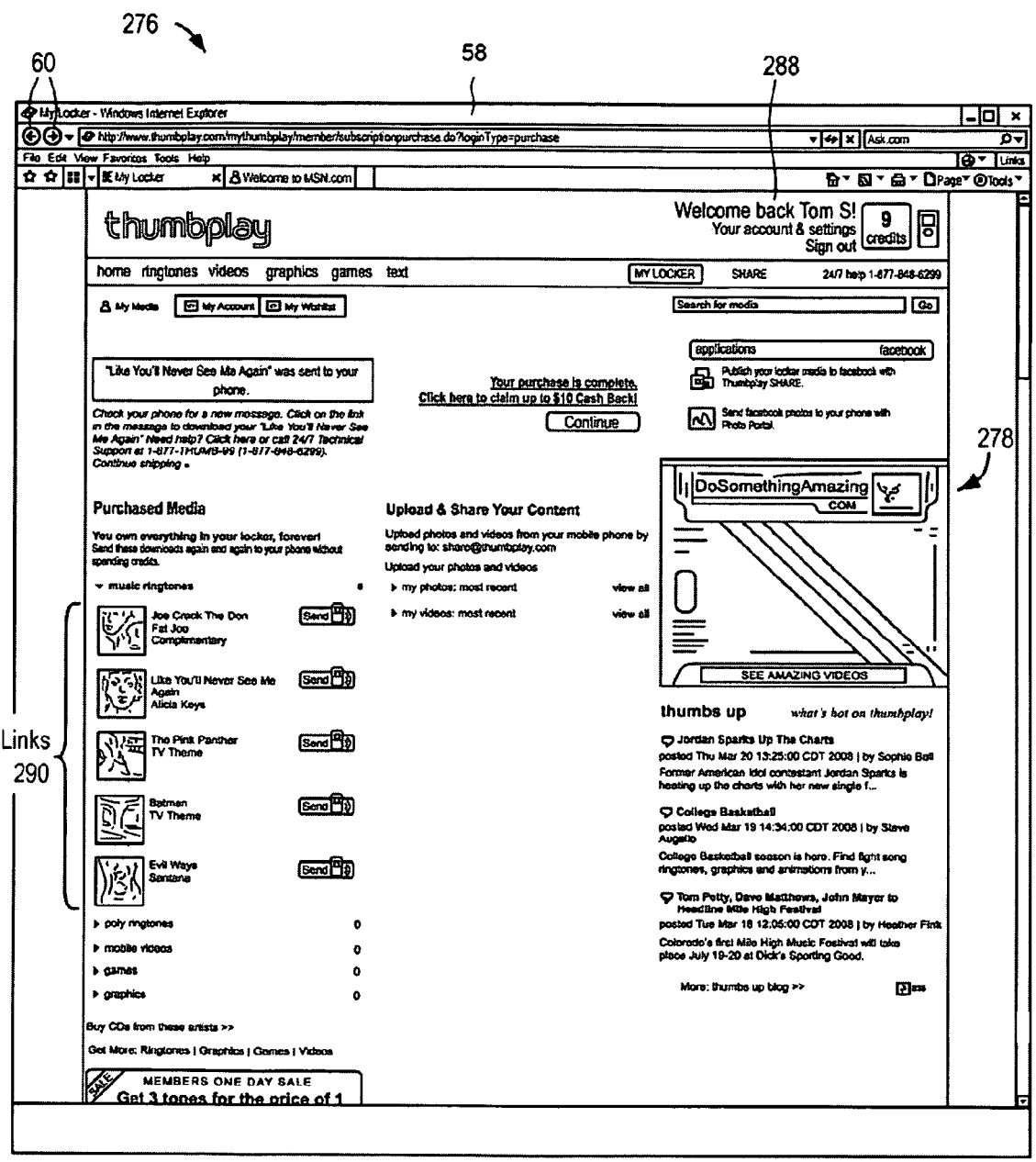
FIG. 16 is a screen shot of an Internet browser view displaying a user-specific homepage from a registered user area.

FIG. 16 illustrates a browser view 276 that displays a user-specific homepage 278 at the user computer system 24 in FIG. 1. Because the server computer system 22 has detected login information, the user-specific homepage 278 includes a username 288 from the file database 44 in FIG. 15 corresponding to the login information. The user-specific homepage 278 also includes links 290 from the file database 44 corresponding to media files that have previously been purchased by the specific user of the specific user computer system 24 and represented by the username 288. The user-specific homepage 278 also includes search and browsing functionality that allows the user of the user computer system 24 to search or find other media files for transmission to the user mobile device 32. Upon selection of such media files and instructions for downloading such media files, the media files will be transmitted to the user mobile device 32 without transmitting an intervening page from the server computer system 22 to the user computer system 24 requesting a phone number or login information such as a username or password.

Figure 17:
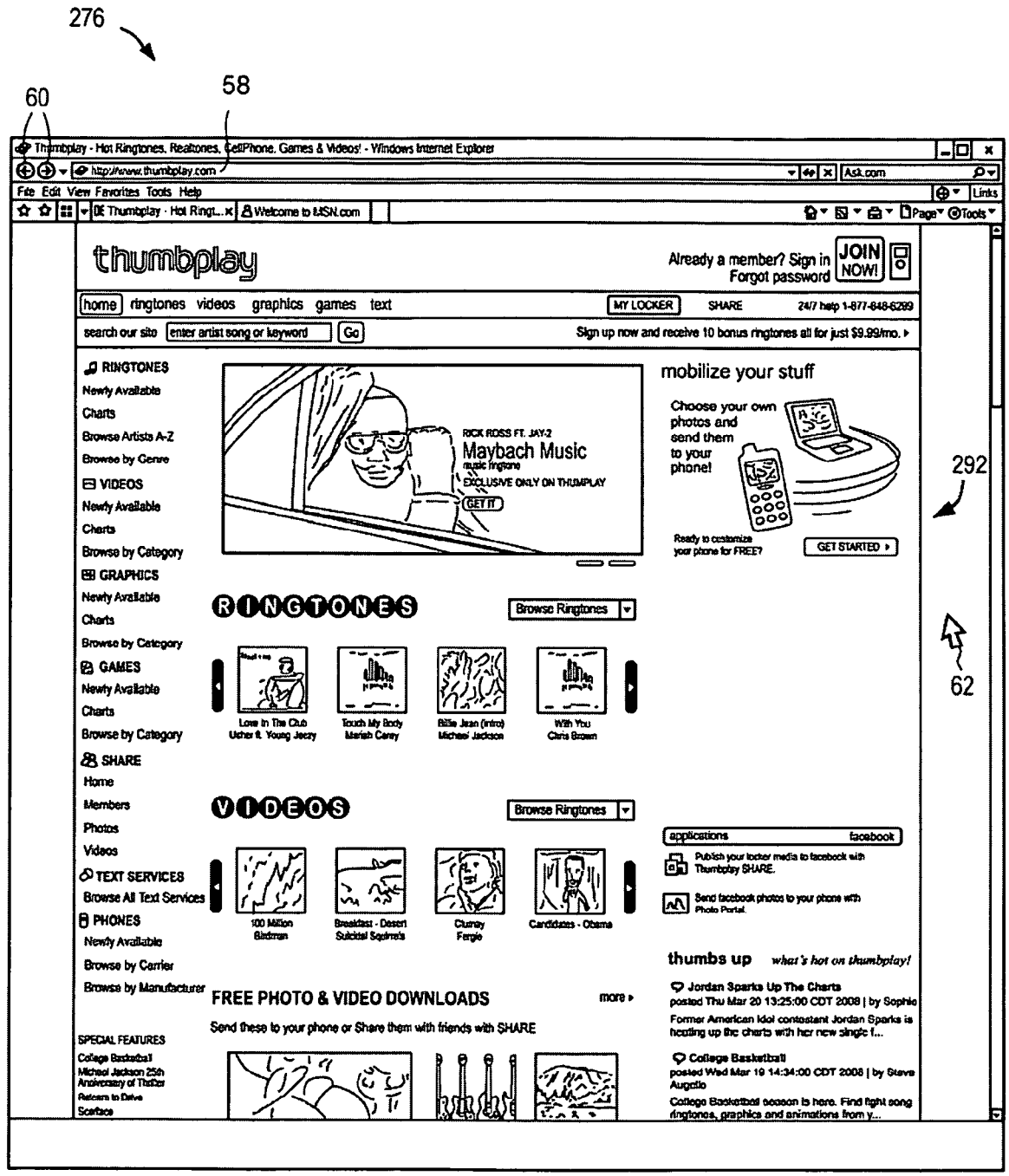
FIG. 17 is a view similar to FIG. 4 showing a general homepage from an unregistered user area.

FIG. 17 illustrates a general homepage 292 that is displayed at the user computer system 24 if a login is not detected. The general homepage 292 includes the same search and browse functionality as the user-specific homepage 278 in FIG. 16. However, the username 288 and links 290 in the user-specific homepage 278 of FIG. 16 are not displayed in the general homepage 292 of FIG. 17. A different user-specific homepage is transmitted to each user computer system from which login information is detected, but the same general homepage 292 of FIG. 17 is transmitted to all user computer systems from which login information is not received or cannot be validated.

6. Automatic Login of Mobile Device

Figure 18:
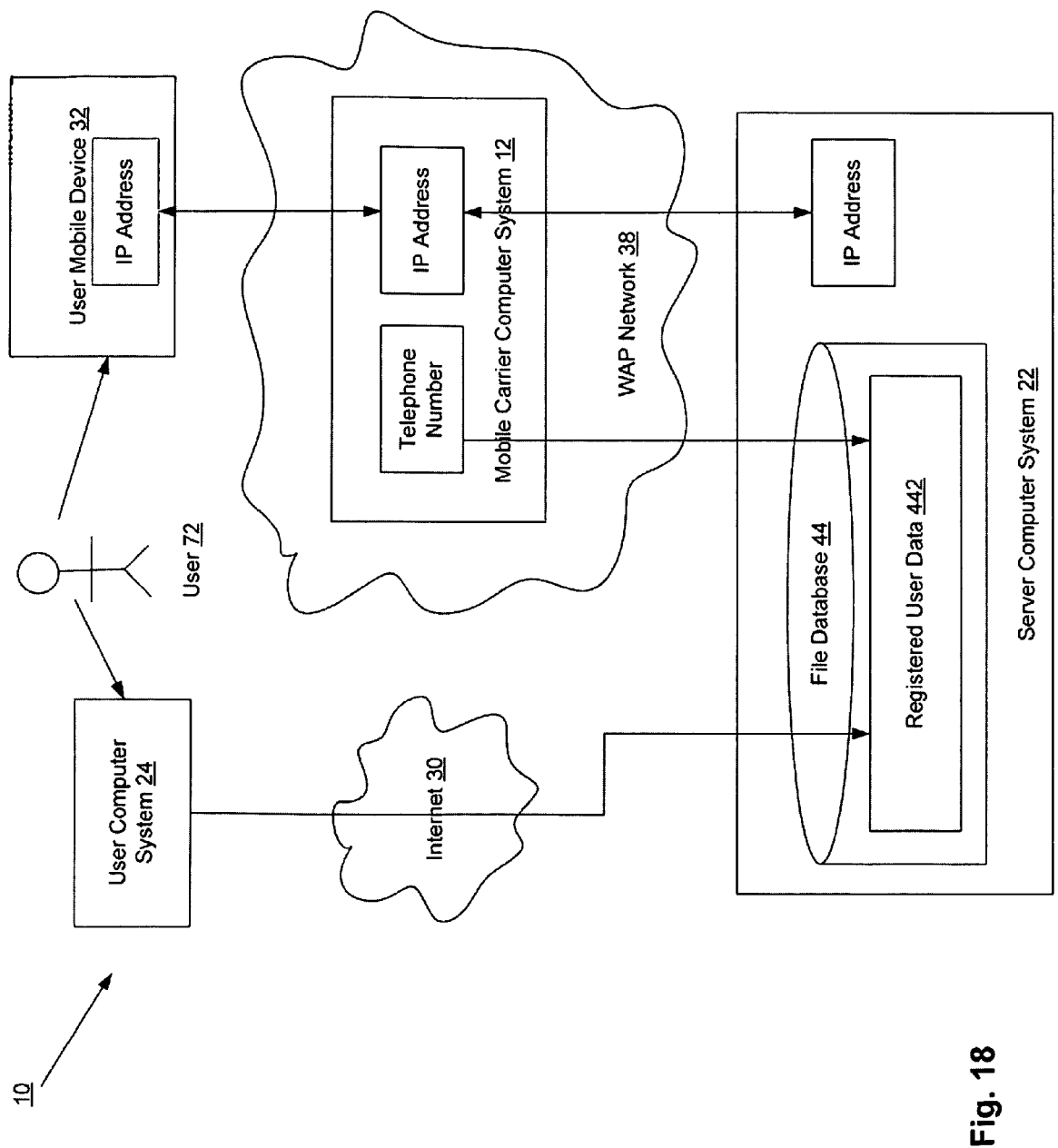
FIG. 18 illustrates a computer and network system that can be used for automatic login of mobile device.

FIG. 18 illustrates a computer and network system 10 that can be used for automatic login of mobile device. The computer and network system 10 includes the user computer system 24, the server computer system 22, the mobile carrier computer system 12, and the user mobile device 32. Although only one user computer system 24 and one user mobile device 32 are shown in FIG. 18, there may be a plurality of user computer systems and a plurality of user mobile devices in the computer and network system 10. The user computer system 24 is connected to the server computer system 22 over the Internet 30 or other forms of network. The server computer system 22 has a file database 44 for storing registered user data 442 and has memory for storing data such as an Internet Protocol (IP) address. The registered user data 442 includes username, password, phone number, and email address that is associated with a particular user 72. It also includes user-specific settings, for example, a user-specific homepage that is presented to the user 72 when the user is first logged into the server computer system 22.

The user mobile device 32 is connected to the server computer system 22 over the WAP network 38 which is maintained by the mobile carrier computer system 12. Both the user mobile device 32 and the mobile carrier computer system 12 have memories for storing IP addresses. In addition, the mobile carrier computer system 12 also has memory for storing unique identifier of the user mobile device, for example, a telephone number.

In use, the mobile carrier computer system 12 dynamically assigns an IP address to the user mobile device 32. Although the IP address assigned to the user mobile device 32 may stay the same for long periods of time, it can generally change. In contrast to static IP addresses which do not change, dynamic IP addresses have several advantages. They avoid the administrative burden of assigning specific static addresses to each user mobile device on a network. In some instances, they also allow many user mobile devices to share limited address space on a network when not all of them are online at the same time. In use, the mobile carrier computer system 12 keeps track of the unique identifier of a particular user mobile device, to which a particular dynamic IP address is assigned.

Figure 19:
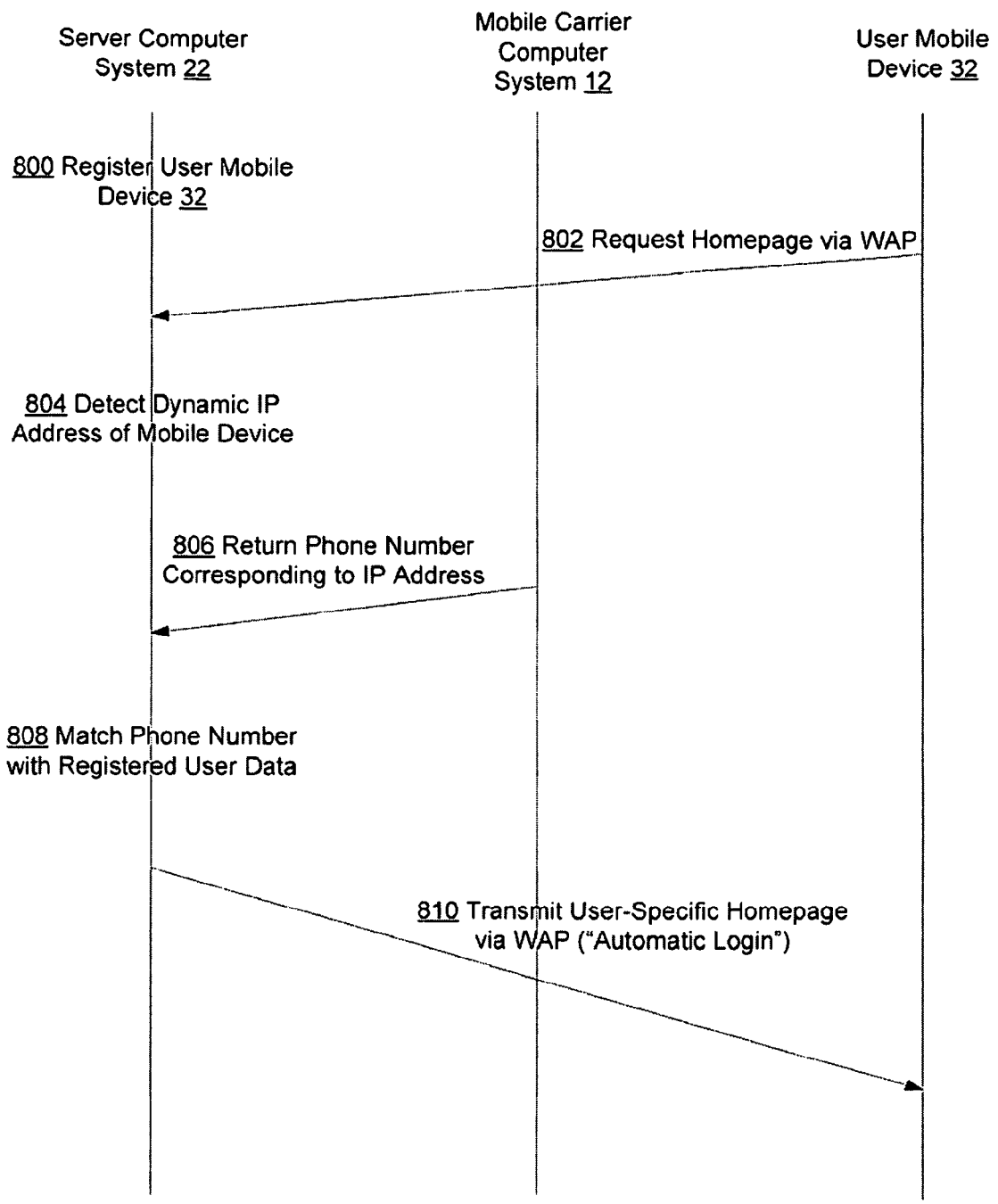
FIG. 19 illustrates signals that are transmitted between the server computer system, the carrier computer system, and the user mobile device.

In use, the user 72 has control of both the user computer system 24 and the user mobile device 32. FIG. 19 illustrates signals that are transmitted between the server computer system 22, the carrier computer system 12, and the user mobile device 32 in FIG. 1. At step 800, the user 72 may register both the user computer system 24 and the user mobile device 32 at the server computer system 22 using the user computer system 24. Details of the registration process are described in the last section. When the registration is completed, an entry is created in the registered user data 442 in FIG. 18 that includes the unique phone number of the user mobile device 32. A user-specific homepage associated with the user mobile device 32 is also saved in the registered user data 442.

At step 802, when the user 72 enters the URL http://www.thumbplay.com in the WAP browser on the user mobile device 32, the device sends a homepage request to the server computer system 22 via WAP network. At step 804, the server computer system 22 detects the IP address of the user mobile device 32 via the mobile carrier computer system 12. At step 806, the carrier computer system 12 sends to the server computer system 22 a phone number that corresponds to the IP address. At step 808, the server computer system 22 then compares the phone number with registered user data 442. At step 810, upon a favorable comparison of the phone number, the server computer system 22 retrieves from registered user data 442 the user-specific homepage associated with the phone number, and sends the homepage to the user mobile device 32. In this way, the mobile device 32 is automatically logged onto the server computer system 22 without the need to transmit any login information such as user name and password.

Alternatively, the user 72 may send an SMS message with a homepage identifier "Homepage" to the server computer system 22. The server computer system 22 goes through steps 804, 806, and 808 above. Upon a favorable comparison of the phone number, the server computer system 22 sends an SMS message to the user mobile device 32 with a link to the user-specific homepage. When the user 72 selects the link, the WAP browser on the user mobile device will be launched with the user-specific homepage.

7. Computer System

Figure 20:
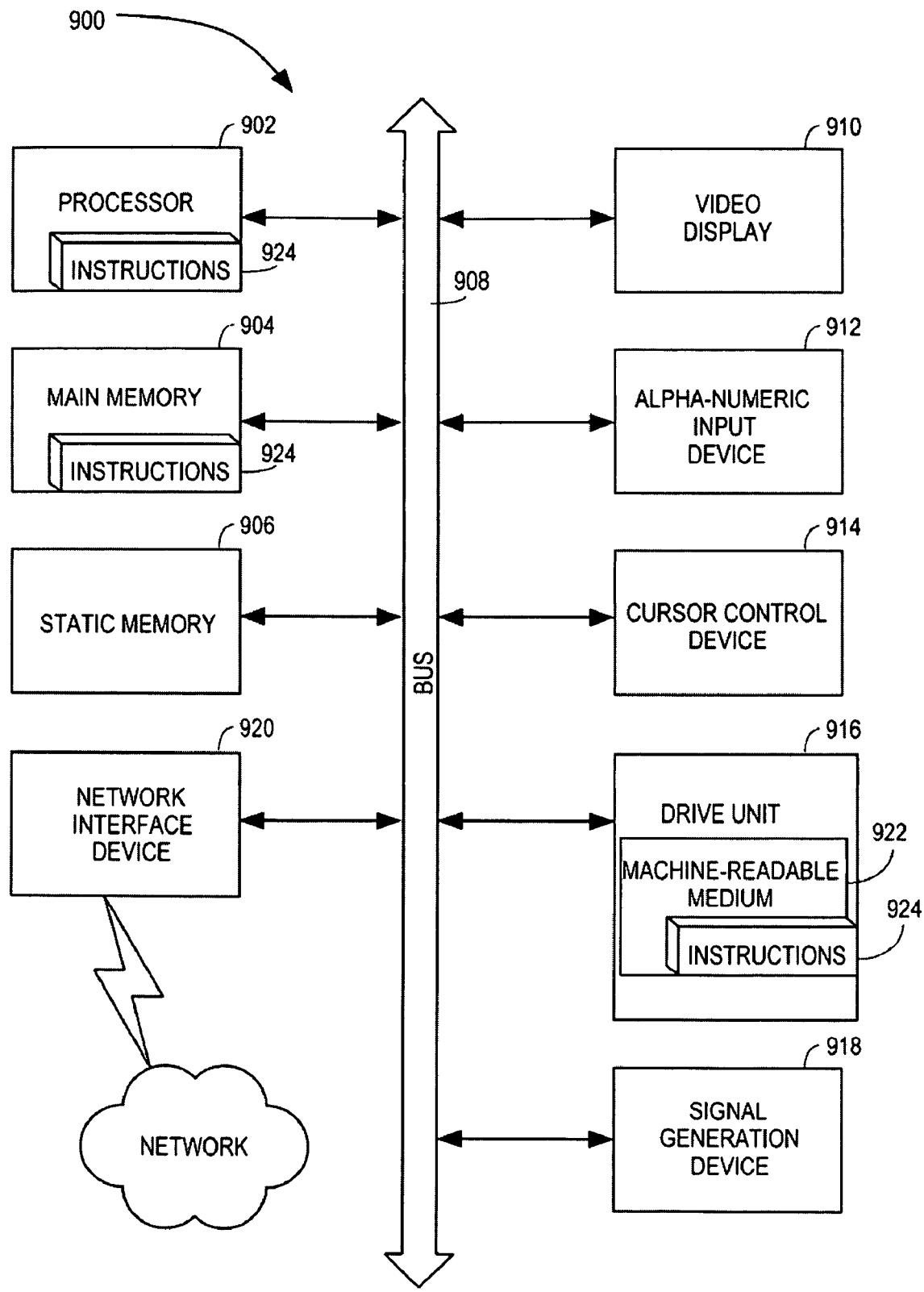
FIG. 20 is a block diagram of components of a server computer system in FIG. 1.

FIG. 20 shows a diagrammatic representation of a machine in the exemplary form of a computer system 900 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processor 902 (e.g., a central processing unit (CPU), a graphics processing unit (GPU) or both), a main memory 904 (e.g., read only memory (ROM), flash memory, dynamic random access memory (DRAM) such as synchronous DRAM (SDRAM) or Rambus DRAM (RDRAM), etc.), and a static memory 906 (e.g., flash memory, static random access memory (SRAM), etc.), which communicate with each other via a bus 908.

The computer system 900 may further include a video display 910 (e.g., a liquid crystal display (LCD) or a cathode ray tube (CRT)). The computer system 900 also includes an alpha-numeric input device 912 (e.g., a keyboard), a cursor control device 914 (e.g., a mouse), a disk drive unit 916, a signal generation device 918 (e.g., a speaker), and a network interface device 920.

The disk drive unit 916 includes a machine-readable medium 922 on which is stored one or more sets of instructions 924 (e.g., software) embodying any one or more of the methodologies or functions described herein. The software may also reside, completely or at least partially, within the main memory 904 and/or within the processor 902 during execution thereof by the computer system 900, the main memory 904 and the processor 902 also constituting machine-readable media.

The software may further be transmitted or received over a network 928 via the network interface device 920.

While the machine-readable medium 924 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:

1. A computer-based method for logging a user mobile device onto a server computer system, comprising:
   registering a unique identifier of a user mobile device;
   receiving by the server computer system a first message from the user mobile device via a network maintained by a mobile carrier computer system, the network maintained by the mobile carrier computer system being a Wireless Application Protocol network, and wherein the first message is an SMS message;
   detecting an Internet Protocol address associated with the user mobile device in response to receiving the first message;
   receiving by the server computer system a second message originating from the mobile carrier computer system, the second message including a unique identifier from the mobile carrier computer system, the unique identifier corresponding to the Internet Protocol address associated with the user mobile device;
   comparing the unique identifier received from the mobile carrier computer system to the registered unique identifier of the user mobile device; and
   and in response to determining that the unique identifier received from the mobile carrier computer system corresponds to the registered unique identifier of the user mobile device, transmitting to the user mobile device a third message, wherein the third message is an SMS message and has a link to a user-specific homepage, and wherein the user-specific homepage also includes links from a file database corresponding to media files a user of the user mobile device is authorized to access.

2. The computer-based method in claim 1, wherein the unique identifier is a phone number.

3. The computer-based method in claim 1, wherein the Internet Protocol address is dynamically updated.

4. The computer-based method in claim 1, wherein the first message is a request for a file.

5. The computer-based method in claim 1, wherein registering the unique identifier of a user mobile device comprising providing an interface with a field for entering registration information.

6. The computer-based method in claim 5, wherein entering registration information comprising entering a phone number.

7. A non-transitory computer-readable storage medium having stored thereon a set of instructions which, when executed by a processor of a computer carries out a method comprising:
   registering a unique identifier of a user mobile device;
   receiving by a server computer system a message from the user mobile device via a network maintained by a mobile carrier computer system, the network maintained by the mobile carrier computer system being a Wireless Application Protocol network, and wherein the first message is an SMS message;
   detecting an Internet Protocol address associated with the user mobile device in response to receiving the first message;
   receiving by the server computer system a second message originating from the mobile carrier computer system, the second message including a unique identifier from the mobile carrier computer system, the unique identifier corresponding to the Internet Protocol address associated with the user mobile device;
   comparing the unique identifier received from the mobile carrier computer system to the registered unique identifier of the user mobile device; and
   in response to determining that the unique identifier received from the mobile carrier computer system corresponds to the registered unique identifier of the user mobile device, transmitting to the user mobile device a third message; wherein the third message is an SMS message and has a link to a user-specific homepage, and wherein the user-specific homepage also includes links from a file database corresponding to media files a user of the user mobile device is authorized to access.

8. A server computer system comprising:
   a memory and processor connected to the memory;
   a database stored in the memory, the database including a plurality of registered users;
   a computer program stored in the memory and executable by the processor, the program including:
     a first interface having field for entering registration information;
     a detecting module for detecting an Internet Protocol address of a user mobile device in response to the server computer system receiving a first message from the user mobile device via a network maintained by a mobile carrier computer system, the network maintained by the mobile carrier computer system being a Wireless Application Protocol network, and wherein the first message is an SMS message;
     a receiving module for receiving the first message and a second message from a mobile carrier computer system, the second message including a unique identifier of the user mobile device originating from the mobile carrier computer system, the unique identifier of the user mobile device corresponding to the Internet Protocol address of a user mobile device;

a first matching module for matching the unique identifier received from the mobile carrier computer system with registered user data; and a second interface that is, in response to the first matching module matching the unique identifier received from the mobile carrier computer system with registered user data, transmitted to a user mobile device in a third message, the second interface displaying a user-specific homepage, wherein the third message is an SMS message, and wherein the user-specific homepage also includes links from a file database corresponding to media files a user of the user mobile device is authorized to access.

* * * * *